United States Patent [19]

Curran

[11] Patent Number: 5,543,975
[45] Date of Patent: Aug. 6, 1996

[54] REMOVAL OF PRECOMPENSATION IN A WRITE DATA SIGNAL FROM A FLEXIBLE DISK CONTROLLER

[75] Inventor: Daniel J. Curran, Fort Collins, Colo.

[73] Assignee: Hewlett-Packard Company, Palo Alto, Calif.

[21] Appl. No.: 311,832

[22] Filed: Sep. 23, 1994

Related U.S. Application Data

[63] Continuation of Ser. No. 152,113, Nov. 12, 1993, abandoned.

[51] Int. Cl.[6] ............................................. G11B 5/09
[52] U.S. Cl. ............................................. 360/45; 360/46
[58] Field of Search ........................... 360/45, 46, 39, 360/48; 375/99, 101; 369/59, 60

[56] References Cited

U.S. PATENT DOCUMENTS

| | | | |
|---|---|---|---|
| 4,635,141 | 1/1987 | Coulter | 360/45 |
| 4,672,482 | 6/1987 | Troletti | 360/45 |
| 5,184,256 | 2/1993 | Chikusa | 360/45 |
| 5,187,614 | 2/1993 | Hashimoto et al. | 360/45 |

*Primary Examiner*—W. Chris Kim
*Attorney, Agent, or Firm*—Augustus W. Winfield

[57] ABSTRACT

A method for removing precompensation in a Write Data signal from a flexible disk controller. A timer measures the time between consecutive transitions. Numerical values from the timer are delayed in a buffer. Numerical times from the buffer are compared to numerical ranges by an array of parallel numerical comparators. Numerical times corresponding to precompensation ranges are numerically compensated. The compensated values are then used to control the time between transitions in a regenerated Write Data signal.

2 Claims, 3 Drawing Sheets

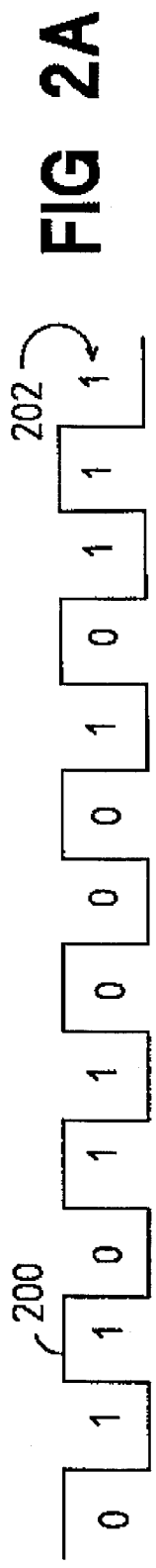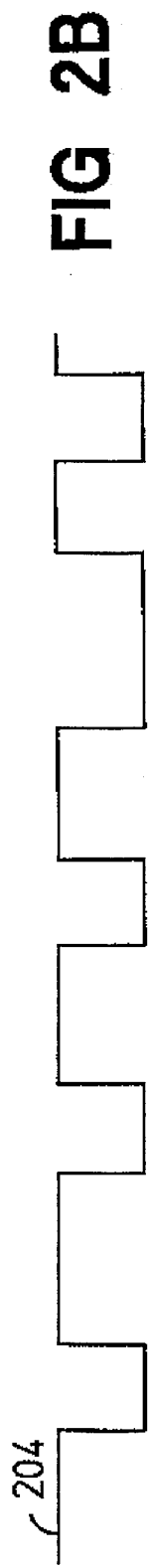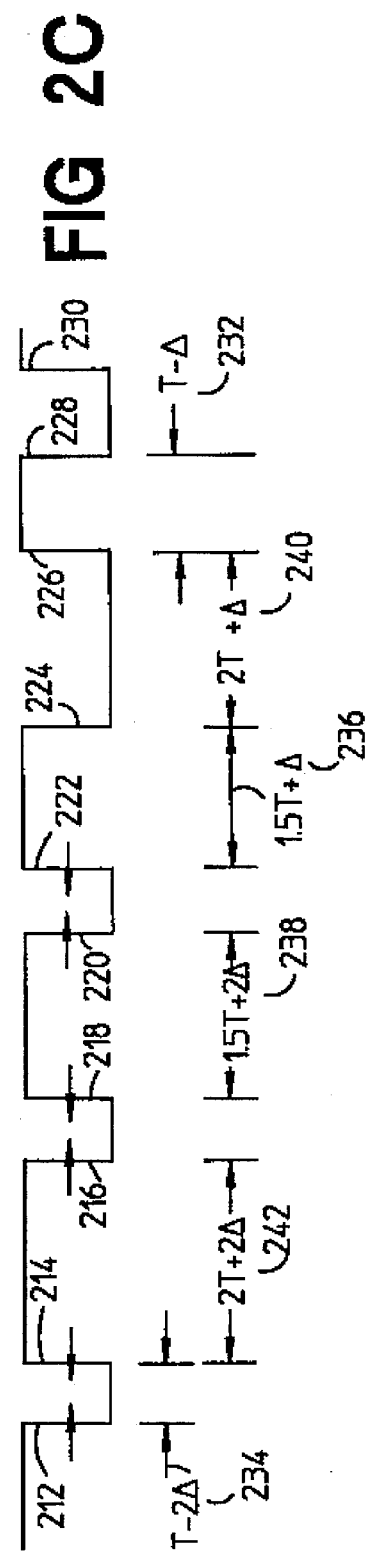

REMOVAL OF PRECOMPENSATION IN A WRITE DATA SIGNAL FROM A FLEXIBLE DISK CONTROLLER

CROSS REFERENCE TO RELATED APPLICATIONS

This is a continuation of application Ser. No. 08/152,113 filed on Nov. 12, 1993 now abandoned.

FIELD OF INVENTION

This invention relates generally to tape drives and flexible disk drives and more specifically to use of a magnetic head requiring non-standard precompensation of write data.

BACKGROUND OF THE INVENTION

In general, in digital recording, information is encoded in the spacing of magnetic polarity transitions. During the reading process, the polarity transitions are converted into voltage pulses, so that the information in the read signal is encoded in the spacing of pulse peaks. Therefore, for data integrity, the accuracy of the timing of the peaks in the read signal is critical. There are, however, inherent distortions of the read signal that must be accommodated.

Binary information on magnetic flexible disks is stored by magnetizing small areas of the magnetic surface with one of two polarities. For most flexible disk drives used in personal computers, the small magnetized areas are recorded primarily longitudinally (in the plane of the surface). Although the magnetized areas are primarily longitudinal, they also have an unavoidable partial vertical component (perpendicular to the surface). During reading, a magnetic coil in a read head intersects magnetic fields from the small magnetized areas. As the head passes through the fields, a transition from one polarity to the opposite polarity results in a changing field that in turn induces a changing current in the coil of the read head. The changing current typically drives a resistive load to provide a voltage signal. Ideally, for purely longitudinal magnetization, an isolated transition from one polarity to the opposite polarity results in a perfectly symmetrical voltage pulse. Ideally, for purely vertical magnetization, an isolated transition from one polarity to the opposite polarity results in a perfectly symmetrical dipulse (a pulse of one polarity followed by a pulse of the opposite polarity). The combined longitudinal and vertical components result in an asymmetrical voltage pulse. The asymmetry is sometimes referred to as a peak shift. As bit densities increase, the transitions are no longer isolated. In particular, if two adjacent write transitions are very close together, the combined effects of peak shift and adjacent pulses make the time between read pulses on read-back longer than the time between the transitions during writing.

Given a particular digital pattern in the write waveform, it is possible to predict some of the resulting distortion in the read waveform. It is then possible to distort the writing signal to "precompensate" for distortion in the read process. For example, if two adjacent write transitions are very close together, then the first transition may be written "late" and the second transition written "early." As a result, the time between transitions during writing is shorter than the "ideal" time and the time between pulses during read back is equal to the "ideal" time. In many flexible disk controllers, this is done only on inner tracks where bit densities are highest.

Within a personal computer, the flexible disk controller may be used to control not only multiple flexible disk drives but also may be used to control a data recording tape drive. Precompensation by advancing and delaying polarity transitions is appropriate for flexible disk drives but may not be appropriate for tape drives sharing the same controller. As hard disk capacity increases, there is a need for tape back-up drives having substantially higher bit densities than flexible disks. For these higher bit densities, precompensation designed for flexible disks has a substantial negative effect on data integrity. In many computer systems, however, precompensation is permanently enabled in hardware and cannot be turned off by software drivers. If a high density tape drive is used with a flexible disk controller with automatic precompensation that cannot be turned off, the tape drive needs to be able to detect the precompensation and remove it.

SUMMARY OF THE INVENTION

The present invention detects the presence of precompensation in a Write Data signal from a flexible disk controller and removes the precompensation. First, the time between Write Data transitions is measured. Numerical time measurements falling within any of thirteen different ranges are modified by fixed increments or decrements. The modified numerical values are then used to time transitions during generation of a new Write Data signal that has no precompensation.

BRIEF DESCRIPTION OF THE DRAWINGS

FIG. 2A is a timing diagram of a clock signal for a flexible disk controller and example binary data in conjunction with the clock signal.

FIG. 2B is a timing diagram of an ideal Write Data signal from the flexible disk controller in conjunction with the clock and data of FIG. 2A.

FIG. 2C is a timing diagram of a precompensated Write Data signal in conjunction with the Write Data signal of FIG. 2B.

DETAILED DESCRIPTION OF THE PREFERRED EMBODIMENT OF THE INVENTION

Figure 1:
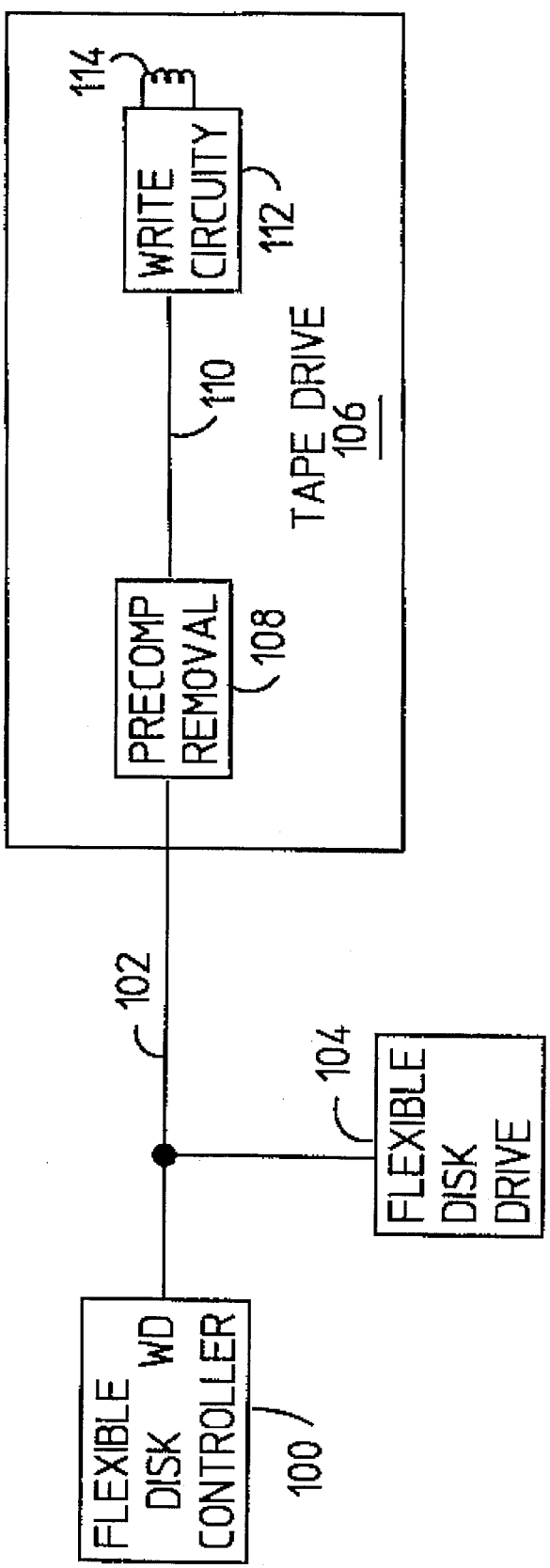
FIG. 1 is a block diagram schematic of a computer mass memory system.

FIG. 1 is a block diagram illustrating a flexible disk controller 100 connected to a flexible disk drive 104 and a tape drive 106. The Write Data signal 102 from the flexible disk controller has precompensation as described below. The tape drive 106 has precomp removal 108 that removes the precompensation. The resulting modified Write Data signal 110 goes to tape write circuitry 112 that controls a magnetic write head 114.

Binary data in magnetic recording is encoded in the spacing of magnetic polarity reversals. The particular encoding used by most "double density" personal computer flexible disks is called the Modified Frequency Modulation (MFM) code or Miller code. FIG. 2A is a timing diagram illustrating a clock signal 200 and a series of bits 202. FIG. 2B is a timing diagram illustrating a MFM encoded waveform 204 corresponding to the data bits 202. Each half-period of the clock signal 200 is a cell. For FM encoding (not illustrated) there is a transition at the edge of each cell. There is a transition only at the edge of the cell if the bit is a "zero," and there is an additional transition in the center of the cell if the bit is a "one." Modified FM encoding 204 removes the transitions at the cell edges if the bit is a "one". In FIG. 2B, note that the time between transitions in the resulting MFM waveform can be one of three different time periods. If half the clock period is designated as a unit of time T, then the time between transitions can be T (206), 1.5T (208) or 2T (210). In many personal computer flexible disk controllers, the clock signal 200 is 250 KHz, T is 2 µS, 1.5T is 3 µS and 2T is 4 µS.

For precompensation, the flexible disk controller (FIG. 1, 100) can advance or delay a polarity transition by .125 µS. If a particular transition is separated from one adjacent transition by time T, and is separated by another transition by a time greater than T, then the particular transition is either advanced or delayed as appropriate to move it closer to the transition separated at time T. This is illustrated in FIG. 2C. In FIG. 2C, transition 212 is separated from transition 214 by time T and is separated from an earlier transition (not illustrated) by a time greater than T. Therefore, transition 212 is delayed to move it closer to transition 214. Transition 214 is separated from transition 212 by time T and is separated from transition 216 by time greater than T. Transition 214 is advanced to move it closer to transition 212. Similarly, transitions 216 and 218 are moved closer together and transitions 220 and 222 are moved closer together. Transition 224 is not separated from any other transition by time T so transition 224 is not moved. Transition 226 is moved toward transition 228. Transition 228 is separated from transition 226 by time T and from transition 230 by time T so transition 228 is not moved.

FIG. 2C illustrates all the possible net time changes between consecutive transitions resulting from advances and delays of individual transitions. Designating Δ=0.125 µS, a transition time of T may be changed to become T-Δ (232) or T-2Δ (234) after precompensation. A transition time of 1.5T may be changed to become 1.5T+Δ (236) or 1.5T+2Δ (238). Finally, a transition time of 2T may be changed to become 2T+Δ (240) or 2T+2Δ (242). Transition times may also remain unchanged (not illustrated in FIG. 2C).

Figure 3:
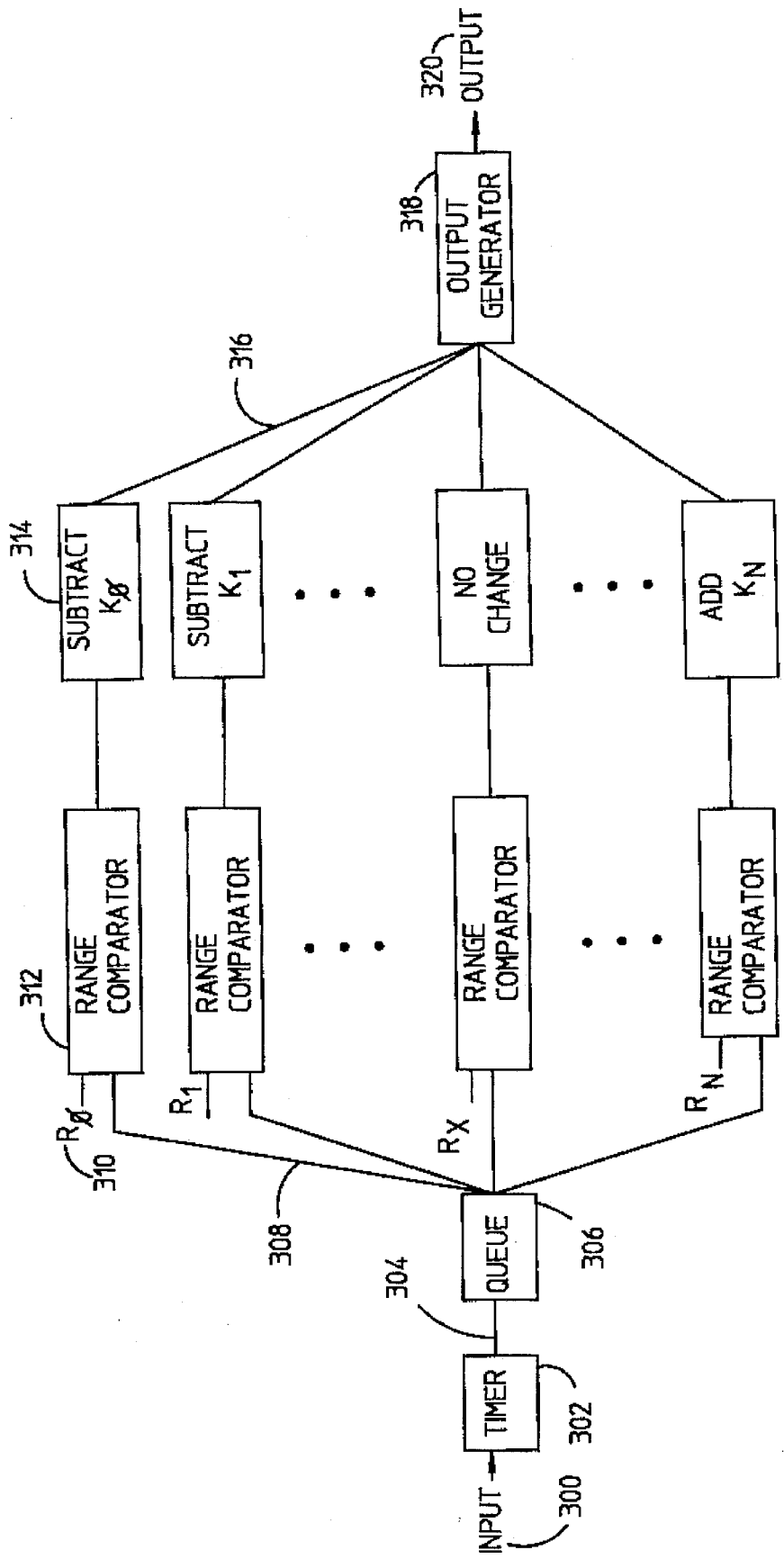
FIG. 3 is a block diagram schematic of a precompensation removal system.

FIG. 3 illustrates a block diagram schematic of a system for removing precompensation (FIG. 1, 108). The system illustrated in FIG. 3 receives a binary input waveform 300 as illustrated by FIG. 2C and generates a binary output waveform 320 as illustrated by FIG. 2B. The functional blocks illustrated in FIG. 3 may be implemented in microprocessor firmware or in hardware as appropriate. A timer 302 generates a numerical value 304 representing the time between consecutive transitions of the binary input waveform 300. The numerical value 304 goes to a queue 306 discussed in more detail below. Delayed outputs 308 from the queue 306 go to a parallel array of numerical range comparators 312. Each range comparator 312 compares the numerical value 308 from the queue 306 to a numerical range R (310). The total aggregation of comparator ranges 310 covers the total possible numerical range of the output 304 of the timer 302 so that each output 304 of the timer 302 must fall within the range 310 of one of the comparators 312. If the delayed numerical value 308 from the queue 306 falls within the range R (310) then a corresponding arithmetic compensation 314 is computed. The arithmetic compensation 314 may be an addition of a constant, a subtraction of a constant or no change. Each numerical value 316 from the arithmetic compensation blocks 314 controls the time between two consecutive transitions from a binary output waveform generator 318.

Since a relatively long transition time may be followed by a relatively short transition time, the numerical outputs 304 from the timer 302 must be delayed and queued before the output generator 318 generates a new output waveform 320. For example, consider the two consecutive transition times 236 and 240 in FIG. 2C. At the trailing edge of time 236, a numerical value corresponding to 1.5T is generated and the output generator waits 1.5T seconds to generate the next transition. The output generator must have a new numerical value in place before 1.5T seconds have transpired. Without a queue, however, a new numerical time is not in place until the trailing edge of time 240 (2T+Δ seconds later). Without a queue, this new numerical time is too late. The queue 306 buffers and delays multiple transition times for the output generator 318. Note that the queue 318 may be placed between the arithmetic compensation blocks 314 and the output generator 318 instead of between the timer 302 and the range comparators 312 as illustrated. If it were possible for the precompensation to add times to all transition times, the system output would always generate a shorter transition time than the incoming transition time, requiring an infinite queue to avoid emptying the queue. Alternatively, if all output transition times must be longer than incoming times, an infinite queue would be required to avoid overflowing the queue. Fortunately, as illustrated in FIGS. 2A and 2C, on average, the precompensated waveform must remain synchronized to the data clock (FIG. 2A). A queue of four numbers is adequate to prevent emptying or overflow. In a specific embodiment, the queue 306 is a first-input-first-output (FIFO) buffer, capable of storing four 8-bit numbers.

Appendix 1 is a table illustrating specific values for the comparator ranges (FIG. 3, 310) and arithmetic compensation (FIG. 3, 314) for a specific embodiment of the precompensation removal system (FIG. 3). The numerical values in Appendix 1 are for a system in which half the clock period (FIG. 2B, 206) is 2.0 µS and the timer (FIG. 3, 302) has a 24 $MH_z$ clock (not illustrated). The numerical output (FIG. 3, 304) of the timer (FIG. 3, 302) is an 8-bit value with 7 bits used for times (range=0–127) and an 8th overflow bit indicating that no Write Data is present. If the timer (FIG. 3, 302) is synchronized to the clock in the flexible disk controller (FIG. 1,100), a transition time of 2.0 µS results in exactly 48 counts of a 24 $MH_z$ clock and a delay or advance of 0.125 µS results in exactly 3 counts of a 24 $MH_z$ clock. If the clocks are not synchronized, the timer count may be off by one. This is illustrated in Appendix 1. For example, a time period of T (2.0 µS) corresponds to a timer range of 47–49 counts. As an additional example, a time period of T-2Δ (1.75 µS) corresponds to a timer range of 41–42 counts. As illustrated in Appendix 1, an input corresponding to FIG. 2C is converted into an output corresponding to FIG. 2B. That is, precompensation is removed and the ideal waveform without precompensation is regenerated.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

APPENDIX 1

| INPUT RANGE (310) | COMPENSATION (314) | OUTPUT (316) |
| --- | --- | --- |
| 0–40 | No change | 0–40 |
| 41–43 (T – 2Δ) | Add 6 | 47–49 (T) |
| 44–46 (T – Δ) | Add 3 | 47–49 (T) |
| 47–49 (T) | No change | 47–49 (T) |
| 50–70 | No change | 50–70 |
| 71–73 (1.5T) | No change | 71–73 (1.5T) |
| 74–76 (1.5T + Δ) | Subtract 3 | 71–73 (1.5T) |
| 77–79 (1.5T + 2Δ) | Subtract 6 | 71–73 (1.5T) |
| 80–94 | No change | 80–94 |
| 95–97 (2T) | No change | 95–97 (2T) |
| 98–100 (2T + Δ) | Subtract 3 | 95–97 (2T) |
| 101–127 (2T + 2Δ) | Subtract 6 | 95–97 (2T) |
| 104–127 | No change | 104–127 |

What is claimed is:

1. In a data storage system having a Write Data signal comprising consecutive binary transitions, with an ideal time interval between two consecutive binary transitions, the ideal time interval having been modified to a precompensated time interval, a method for converting the precompensated time interval back to the ideal time interval, the method comprising the following steps:

a. timing the precompensated time interval to generate a numerical time;

b. comparing the numerical time to a plurality of numerical time ranges, each numerical time range having a corresponding compensation calculation;

c. selecting one particular numerical time range, in the plurality of numerical time ranges, that includes the numerical time;

d. performing the compensation calculation corresponding to the particular numerical time range to generate a compensated numerical time;

e. waiting an amount of time corresponding to the compensated numerical time; and f. generating a binary waveform transition.

2. In a data storage system having a Write Data signal that has been precompensated from an ideal write signal, a method for converting the precompensated Write Data signal back into the ideal write signal, the method comprising the following steps:

a. detecting precompensation in the Write Data signal;

b. measuring the amount of the precompensation;

c. removing the measured amount of precompensation from the Write Data signal; and d. generating a new write signal without the measured amount of precompensation, the new write signal thereby being equivalent to the ideal write signal.

* * * * *